US 10,486,538 B2

(12) United States Patent
Lewis

(10) Patent No.: US 10,486,538 B2
(45) Date of Patent: Nov. 26, 2019

(54) ELECTROMAGNETIC FIELD CONTROLLING SYSTEM AND METHOD FOR VEHICLE WIRELESS CHARGING SYSTEM

(71) Applicants: Hyundai America Technical Center, Inc., Superior Township, MI (US); Hyundai Motor Company, Seoul (KR); Kia Motors Corporation, Seoul (KR)

(72) Inventor: Allan Lewis, Windsor (CA)

(73) Assignees: Hyundai America Technical Center, Inc., Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 364 days.

(21) Appl. No.: 14/930,147

(22) Filed: Nov. 2, 2015

(65) Prior Publication Data
US 2017/0120757 A1 May 4, 2017

(51) Int. Cl.
B60L 53/124 (2019.01)
H02J 50/60 (2016.01)
H02J 7/02 (2016.01)
B60L 11/18 (2006.01)
B60L 3/00 (2019.01)
(Continued)

(52) U.S. Cl.
CPC .............. B60L 11/182 (2013.01); B60L 3/00 (2013.01); B60L 53/12 (2019.02); B60L 53/20 (2019.02); B60L 53/60 (2019.02); Y02T 10/7005 (2013.01); Y02T 10/7072 (2013.01); Y02T 90/121 (2013.01); Y02T 90/122 (2013.01);
(Continued)

(58) Field of Classification Search
CPC .............................. B60L 11/182; B60L 53/124
USPC .......................................................... 320/108
See application file for complete search history.

(56) References Cited

U.S. PATENT DOCUMENTS 4,634,969 A * 1/1987 Edlin .................... G01R 33/028
324/258
7,002,262 B2 * 2/2006 Miyata .................. B60R 21/013
280/735

(Continued)

FOREIGN PATENT DOCUMENTS

JP 2010-068634 A 3/2010
JP 2011-116246 A 6/2011
(Continued)

Primary Examiner — Drew A Dunn
Assistant Examiner — Jerry D Robbins
(74) Attorney, Agent, or Firm — Mintz Levin Cohn Ferris Glovsky and Popeo, P.C.; Peter F. Corless

(57) ABSTRACT

An electromagnetic field controlling system and method are provided. The electromagnetic field controlling system includes a magnetic field sensor that is disposed proximate to or in a vehicle that charges electric power using a wireless charging system and is configured to detect the magnitude of an electromagnetic field. An output controller adjusts output power in a power transmission side of the wireless charging system based on a comparison between a predetermined value for an electromagnetic field and the magnitude of the electromagnetic field detected by the magnetic field sensor. Accordingly, the magnitude of an electromagnetic field output from a vehicle wireless charging system is controlled within a safe range.

16 Claims, 8 Drawing Sheets

(51) Int. Cl.
*B60L 53/20* (2019.01)
*B60L 53/12* (2019.01)
*B60L 53/60* (2019.01)

(52) U.S. Cl.
CPC ............ *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 9,024,578 B2 * | 5/2015 | Fisher | ................... | H02J 7/0052 |
| | | | | 320/108 |
| 9,575,108 B2 * | 2/2017 | Lu | ...................... | G01R 29/0814 |
| 9,722,447 B2 * | 8/2017 | Partovi | ................... | H02J 7/025 |
| 2007/0024293 A1 * | 2/2007 | Kosaka | ................ | G01R 31/001 |
| | | | | 324/754.21 |
| 2009/0046538 A1 * | 2/2009 | Breed | ..................... | B60C 11/24 |
| | | | | 367/93 |
| 2009/0284245 A1 * | 11/2009 | Kirby | .................. | G06K 7/0008 |
| | | | | 323/318 |
| 2012/0242163 A1 | 9/2012 | Jung et al. | | |
| 2013/0033228 A1 | 2/2013 | Raedy | | |
| 2013/0278211 A1 | 10/2013 | Cook et al. | | |
| 2014/0132207 A1 | 5/2014 | Fisher | | |
| 2014/0266018 A1 * | 9/2014 | Carobolante | ........... | H02J 7/025 |
| | | | | 320/108 |
| 2015/0001967 A1 * | 1/2015 | Hirabayashi | ......... | H04B 5/0037 |
| | | | | 307/149 |
| 2015/0177302 A1 | 6/2015 | Lu et al. | | |

FOREIGN PATENT DOCUMENTS

| | | |
|---|---|---|
| KR | 10-2012-0082768 A | 7/2012 |
| KR | 2013-0014179 A | 2/2013 |
| KR | 10-2013-0068921 A | 6/2013 |

\* cited by examiner

ELECTROMAGNETIC FIELD CONTROLLING SYSTEM AND METHOD FOR VEHICLE WIRELESS CHARGING SYSTEM

BACKGROUND

1. Field of the Invention

The present invention generally relates to an electromagnetic field controlling system and method. More particularly, the present invention relates to an electromagnetic field controlling system and method for a vehicle wireless charging system, which controls the magnitude of an electromagnetic field within a safe range, output from a wireless charging system of a vehicle requiring charging of a battery, such as an electric vehicle and a hybrid electric vehicle.

2. Description of the Related Art

Generally, electric vehicles have a driving motor that is driven by battery power as a power source. A hybrid electric vehicle also includes an engine as a power source. Further, electric vehicles have improved fuel efficiency by using auxiliary power of the motor operated by the battery power when the vehicle is started or accelerated. Particularly, the electric vehicle includes an electric vehicle (EV) that has a battery and a motor driven by battery power and that uses motor torque as a power source, a hybrid electric vehicle (HEV), a range extended electric vehicle (RE-EV), and the like. In other words, an electric vehicle includes the above-described three forms of vehicles and all the vehicles having a battery and a motor that is used as a power source by using battery power.

A technology adaptable to applications requiring a substantial amount of power, for example, battery charging applied to an electric vehicle, plug-in hybrid vehicle, and the like, has been developed. In an electric vehicle, the high capacity battery is required to be charged frequently for driving, and currently, wired charging, in which a plug for transmitting electric power is inserted to a charging inlet of the vehicle, is commonly used.

However, to solve problems of inconvenience with wired charging, wireless charging is actively being researched. Wireless charging technology is based on transmitting and receiving electric power using electromagnetic induction or resonance. To implement wireless charging, wireless charging devices having coils are required in both a power transmission side and a power receiving side. In particular, in wireless charging devices for charging electric vehicles or plug-in hybrid vehicles, since a substantial amount of electric power is required to be transmitted to reduce the battery charging time of a high capacity battery, unwanted electromagnetic waves (e.g., electromagnetic field), which may adversely affect the human body, adjacent electromagnetic instruments, and the like, may be produced.

SUMMARY

Accordingly, an object of the present invention is to provide an electromagnetic field controlling system and method for a vehicle wireless charging system, which control output power in a power transmission side of the vehicle wireless charging system for more effective charging while minimizing adverse effects by unwanted electromagnetic waves generated within the vehicle wireless charging system.

In particular, the present invention provides an electromagnetic field controlling system which may include: a magnetic field sensor disposed proximate to a vehicle that may be charged using a wireless charging system or disposed within the vehicle and configured to detect a magnitude of an electromagnetic field; and an output controller configured to adjust output power in a power transmission side of the wireless charging system based on a comparison between a predetermined value for an electromagnetic field and the magnitude of the electromagnetic field detected by the magnetic field sensor.

In an exemplary embodiment of the present invention, the magnetic field sensor may be implemented as a hall effect sensor. The magnetic field sensor may be disposed on a floor of the vehicle and alternatively, the magnetic field sensor may be disposed in multiple areas defined by a guideline for establishing a permissible electromagnetic field proximate to the vehicle or within the vehicle. The output controller may be configured to adjust output power in the power transmission side to observe (e.g., conform to) the guideline regarding the permissible magnitude of an electromagnetic field, defined for each of the multiple areas in which the magnetic field sensor may be installed.

In addition, the magnetic field sensor may be installed in at least one position among a headrest, a seatback, a seat cushion, and a passenger foot supporting portion of a seat within the vehicle. The output controller may be configured to perform proportional-integral-derivative (PID) control for output power in the power transmission side of the wireless charging system, using the difference between the predetermined value for an electromagnetic field and the magnitude of the electromagnetic field detected by the magnetic field sensor.

Further, the output controller may be configured to reduce the output power in the power transmission side of the wireless charging system to be less than a predetermined level when an error occurs in an operation of the magnetic field sensor. In addition, the electromagnetic controlling system may be turned on before a charging operation of the wireless charging system is started, and may be turned off after the charging operation of the wireless charging system is terminated.

An exemplary embodiment of the present invention may further include a processor including an analog-digital conversion module configured to convert an electromagnetic field detection signal, output from the magnetic field sensor, into a digital value and a unit conversion module configured to convert the digital value, converted by the analog-digital conversion module, into a value based on a unit comparable with the predetermined value for an electromagnetic field. In particular, the processor may be configured to provide the output controller with the value converted by the unit conversion module.

An exemplary embodiment of the present invention may further include a seating sensor, disposed in a seat of the vehicle and configured to detect whether a passenger is seated on the seat (e.g., configured to detect movement or pressure on the seat). In addition, the seating sensor may be disposed in the seat or adjacent to the seat in the vehicle, and the output controller may be configured to adjust the output power in the power transmission side of the wireless charging system, using the magnitude of the electromagnetic field detected by the magnetic field sensor disposed in the seat occupied by a passenger, the seat being detected by the seating sensor. The output controller may further be configured to adjust the output power in the power transmission side of the wireless charging system by comparing the predetermined value for an electromagnetic field with the largest value among the magnitudes of the electromagnetic fields detected by the magnetic field sensors disposed in the seats occupied by a passenger, the seats being detected by the seating sensors.

Moreover, the present invention provides an electromagnetic field controlling method that may include: an electromagnetic field detection operation in which a magnetic field sensor may be configured to detect an electromagnetic field proximate to a vehicle that may be charged using a wireless charging system, or an electromagnetic field within or extraneous to the vehicle; and a control operation in which an output controller may be configured to adjust output power in a power transmission side of the wireless charging system, based on a comparison between a predetermined value for an electromagnetic field and a magnitude of the electromagnetic field detected in the electromagnetic field detection operation.

In an exemplary embodiment of the present invention, the electromagnetic field detection operation may include detecting an electromagnetic field in multiple areas defined by a guideline establishing a permissible electromagnetic field proximate the vehicle or within the vehicle. Additionally, the control operation may include adjusting output power in the power transmission side to observe (e.g., conform with) a guideline regarding a permissible magnitude of an electromagnetic field, defined for each of the multiple areas in which the electromagnetic field may be detected. The embodiment of the present invention may further include a seating detection operation in which a seating sensor may be configured to detect whether a passenger is seated on a seat of the vehicle. The electromagnetic field detection operation may then include detecting an electromagnetic field in the seat of the vehicle, and adjusting output power in the power transmission side of the wireless charging system, using the magnitude of the electromagnetic field detected in the seat occupied by a passenger, the seat being detected in the seating detection operation.

According to the above-described electromagnetic field controlling system and method, when a battery within electric vehicles or hybrid electric vehicles is charged, it may be possible to minimize adverse effects on people nearby or on nearby electromagnetic devices by limiting exposure to electromagnetic field to be less than a maximum permissible level of electromagnetic fields recommended by industrial standards or guidelines. Additionally, maximum power transmission may be practicable within a safe electromagnetic field exposure limit.

Further, according to the electromagnetic field controlling system and method, the magnitude of an electromagnetic field may be detected by a magnetic field sensor for each seat on which a passenger is seated, and a wireless charging system may be operated to maintain the detected magnitude of the electromagnetic field within a safe range. Therefore, the charging efficiency may be maximized while adverse effects by the electromagnetic field may be prevented for the seated passengers. Specifically, as the electromagnetic field controlling system and method may adjust output power in a power transmission side, based on the largest value among the magnitudes of electromagnetic fields in occupied seats detected by seating sensors, the magnitudes of the electromagnetic fields in occupied seats may be maintained to be less than a predetermined value for an electromagnetic field, thus effective control may be possible.

According to the electromagnetic field controlling system and method, the electromagnetic field controlling system may initiate operations before a charging operation of a wireless charging system is started, and may terminate the operations after the charging operation of the wireless charging system is terminated. Therefore, the charging operation of the wireless charging system may be performed safely.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the tem "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an electromagnetic controlling system according to various exemplary embodiments of the present invention is described in detail referring to the accompanying drawings.

Figure 1:
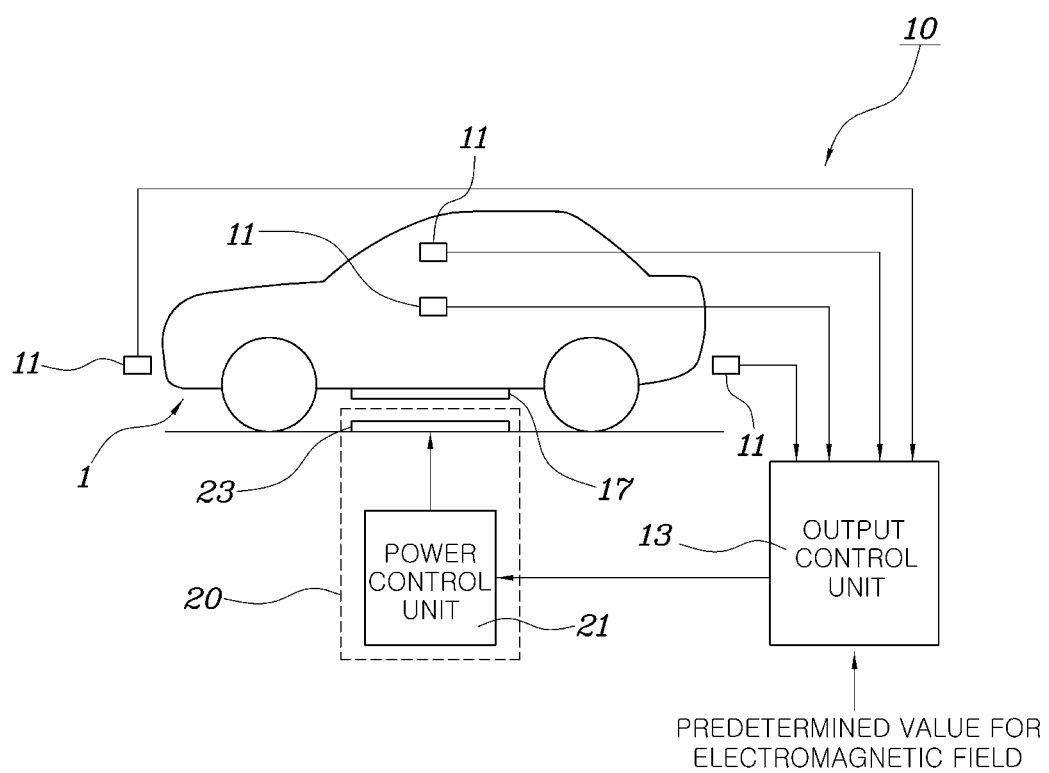
FIG. 1 is a block diagram illustrating an electromagnetic field controlling system according to an exemplary embodiment of the present invention.

FIG. 1 is a block diagram of an electromagnetic controlling system according to an exemplary embodiment of the present invention. Referring to FIG. 1, an electromagnetic controlling system 10 according to an exemplary embodiment of the present invention may include: a magnetic field sensor 11 disposed within or proximate to a vehicle that may be charged using a wireless charging system 20 and configured to detect the magnitude of an electromagnetic field; and an output controller 13 configured to adjust output power in a power transmission side of the wireless charging system 20, based on a comparison between a predetermined value for an electromagnetic field and the magnitude of the electromagnetic field detected by the magnetic field sensor 11.

The magnetic field sensor 11 may be a hall effect sensor configured to detect the magnitude of an electromagnetic field and generate a voltage value that corresponds to the magnitude. Particularly, an exemplary embodiment of the present invention may detect the magnitude of an electromagnetic field by spurious electromagnetic (EM) emissions, which is not directly used for power transmission in the wireless charging system. Due to misalignment of coils used for power transmission, external objects, differences by manufacturers in designing primary coils and secondary coils, and the like, spurious EM emissions have various directionalities. Therefore, the hall effect sensor applied to an exemplary embodiment of the present invention may be a multi-axis hall effect sensor (e.g., a tri-axis hall effect sensor) configured to detect the magnitude of an electromagnetic field by spurious EM emissions in various directions.

Further, the output controller 13 may be configured to output a signal for adjusting output power in the power transmission side of the wireless charging system 20, based on a comparison between a predetermined value for an electromagnetic field and the magnitude of the electromagnetic field detected by the magnetic field sensor 11. For example, the wireless charging system 20 may include a power controller 21 configured to adjust power transmitted from a primary coil 23 by adjusting the magnitude of power provided to the primary coil 23. The output controller 13 may be configured to operate the power controller 21 to adjust the magnitude of power provided to the primary coil 23 by outputting a signal to the power controller 21 of the wireless charging system 20 for adjusting output power in the power transmission side. Accordingly, the output controller 13 may be configured to adjust the output power of the power transmission side.

According to an exemplary embodiment of the present invention configured as the above description, when a battery within an electric vehicle or a hybrid electric vehicle (or other environmentally friendly vehicle) is charged, the output controller 13 may be configured to adjust electromagnetic field exposure proximate to the vehicle or within the vehicle to follow a predetermined value for an electromagnetic field. In other words, when the predetermined value for an electromagnetic field is set to be less than a level recommended by industrial standards or guidelines, the recommended level by the corresponding standards or guidelines may be met (e.g., observed, conformed to, satisfied, etc.) when a vehicle battery is charged, thus adverse effects on people nearby, electromagnetic instruments, and the like may be removed. Additionally, maximum power may be transmitted in a range in which such a recommended level of standards or guidelines may be satisfied. In an exemplary embodiment of the present invention, by determining a proper position of the magnetic field sensor 11, an effective reduction in the adverse effects of electromagnetic fields may be achieved.

Figure 2:
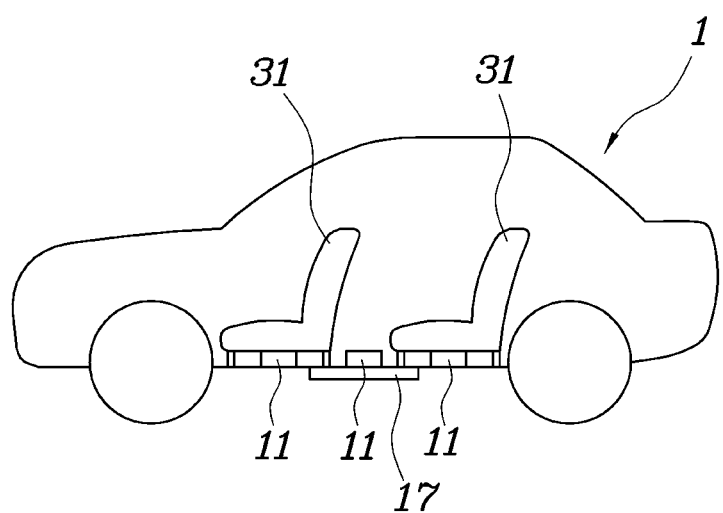
FIGS. 2 to 4 illustrate an example in which a magnetic field sensor of an electromagnetic field controlling system according to an exemplary embodiment of the present invention is installed.
Figure 3:
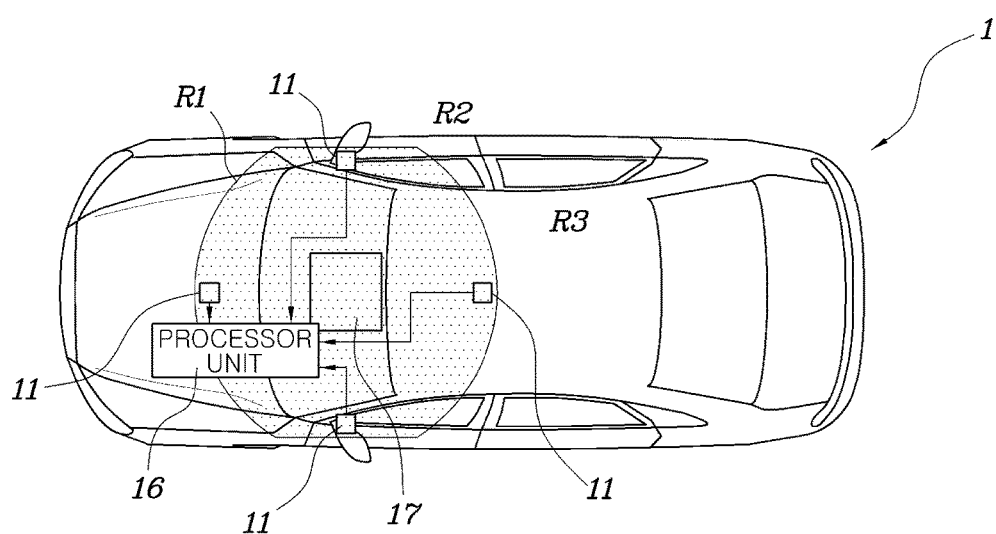
Figure 4:
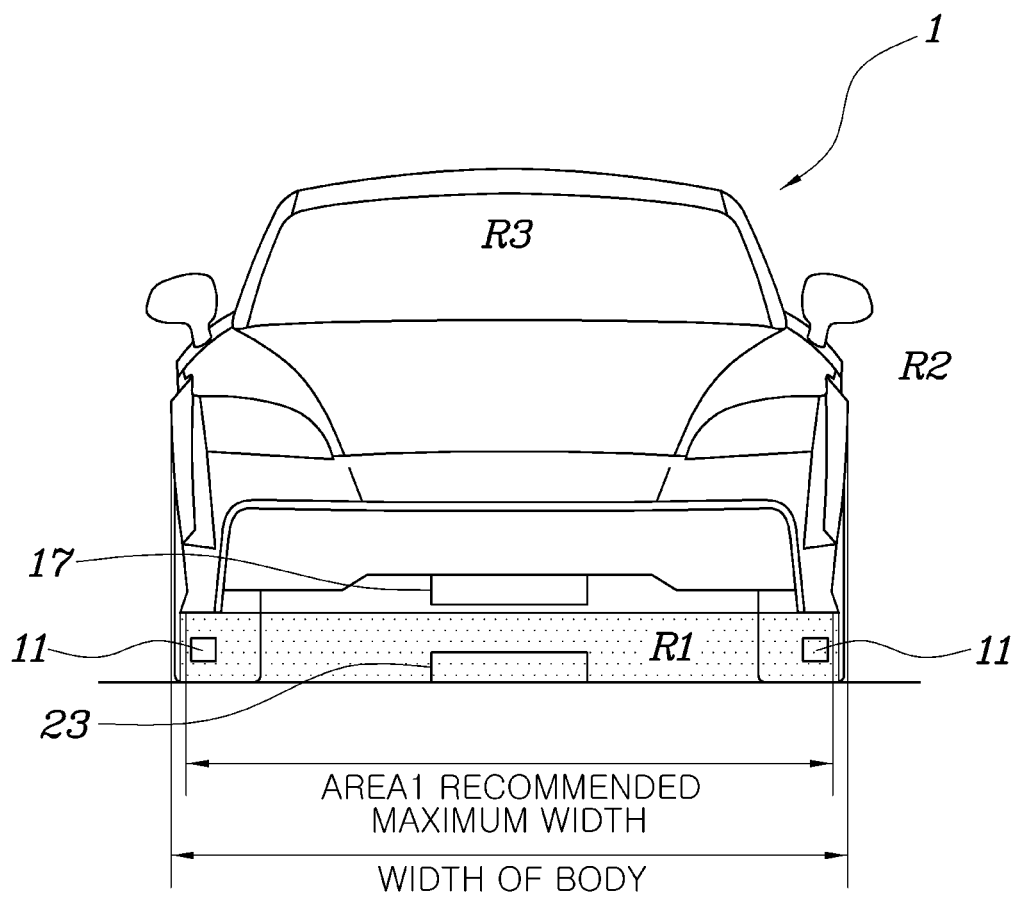

FIGS. 2 to 4 are views illustrating various examples of a position for installing a magnetic field sensor of an electromagnetic controlling system according to an exemplary embodiment of the present invention. First, referring to FIG. 2, a magnetic field sensor 11 may be installed within a vehicle 1. A primary coil 23 in a power transmission side of a wireless charging system 20 may be disposed on the ground where the vehicle 1 is stopped at or moves over. A secondary coil 17 in a power receiving side, of the wireless charging system 20 configured to generate electromotive force by electromagnetic coupling with the primary coil 23, may be installed in the underbody of the vehicle 1 to be exposed to the exterior.

When a battery of an electric vehicle or hybrid electric vehicle is charged wirelessly, the charging may progress or continue while passengers are in the vehicle. In particular, some of electromagnetic fields generated by the primary coil 23 that corresponds to a power transmission side of the wireless charging system 20 may adversely affect the passengers in the vehicle. Accordingly, as illustrated in FIG. 2, magnetic field sensors 11 may be installed inside the vehicle, and the output controller 13 may be configured to adjust output power of the wireless charging system 20 to adjust the magnitude of the electromagnetic fields in the vehicle to correspond to (or be less than) the predetermined value for an electromagnetic field (e.g., the recommended value for an electromagnetic field, known to be safe to a human body). Therefore, wireless charging harmless to human bodies may be available while passengers are in the vehicle.

Particularly, as shown in FIG. 2, since a secondary coil 17 of a power receiving side may be installed in the underbody of the vehicle, the magnetic field sensor 11 may be mounted on the vehicle floor, which is the proximate location to the secondary coil 17 inside the vehicle. Such a configuration may be preferred since the magnitude of the electromagnetic field in the vehicle increases as the distance to the secondary coil 17 decreases. Accordingly, by adjusting the magnitude of the electromagnetic fields to be less than the predetermined value for an electromagnetic field in the closest location to the secondary coil 17, the electromagnetic fields within a safe range may be exposed in other locations in which a substantially less electromagnetic field is measured inside the vehicle.

As shown in FIG. 2, the magnetic field sensor 11 may be disposed in various positions of the vehicle floor, such as underneath the seat 31, a vehicle floor on which passengers' feet rest, and the like. Additionally, as illustrated in FIGS. 3 and 4, an exemplary embodiment of the present invention includes magnetic field sensors 11 mounted in multiple areas divided based on a guideline that establishes permissible electromagnetic waves (e.g., electromagnetic fields) proximate to a vehicle or within a vehicle, and an output controller 13 may be configured to adjust output of a primary coil to satisfy the guideline for the magnitude of the electromagnetic field in the corresponding area in which the magnetic field sensor is installed.

In FIGS. 3 and 4, the areas marked with reference numerals 'R1', 'R2', and 'R3' are areas defined in an Electromagnetic Field (EMF) guideline of Society of Automotive Engineers (SAE). In particular, 'R1' is an area recommended to satisfy a safe guideline for humans and medical devices, 'R2' is an area adjacent to the vehicle body sides, in which the safe guideline for humans and medical devices is should be satisfied, and 'R3' is an area in which a guideline for the interior of a vehicle is applied.

An exemplary embodiment of the present invention considers the magnitude of the electromagnetic field detected in each position proximate to (e.g., also including in the vicinity or surroundings of the vehicle) a vehicle and within the vehicle, and may adjust output of the wireless charging system 20 in order that the magnitude of the exposed electromagnetic field satisfies a level required for the corresponding area. As a result, the exemplary embodiment of the present invention may comply with the socially or legally defined guidelines regarding electromagnetic fields, and may more effectively charge a battery within a range that satisfies the guideline, by considering the magnitude of an electromagnetic field according to each area in vehicle surroundings and vehicle interior.

Figure 5:
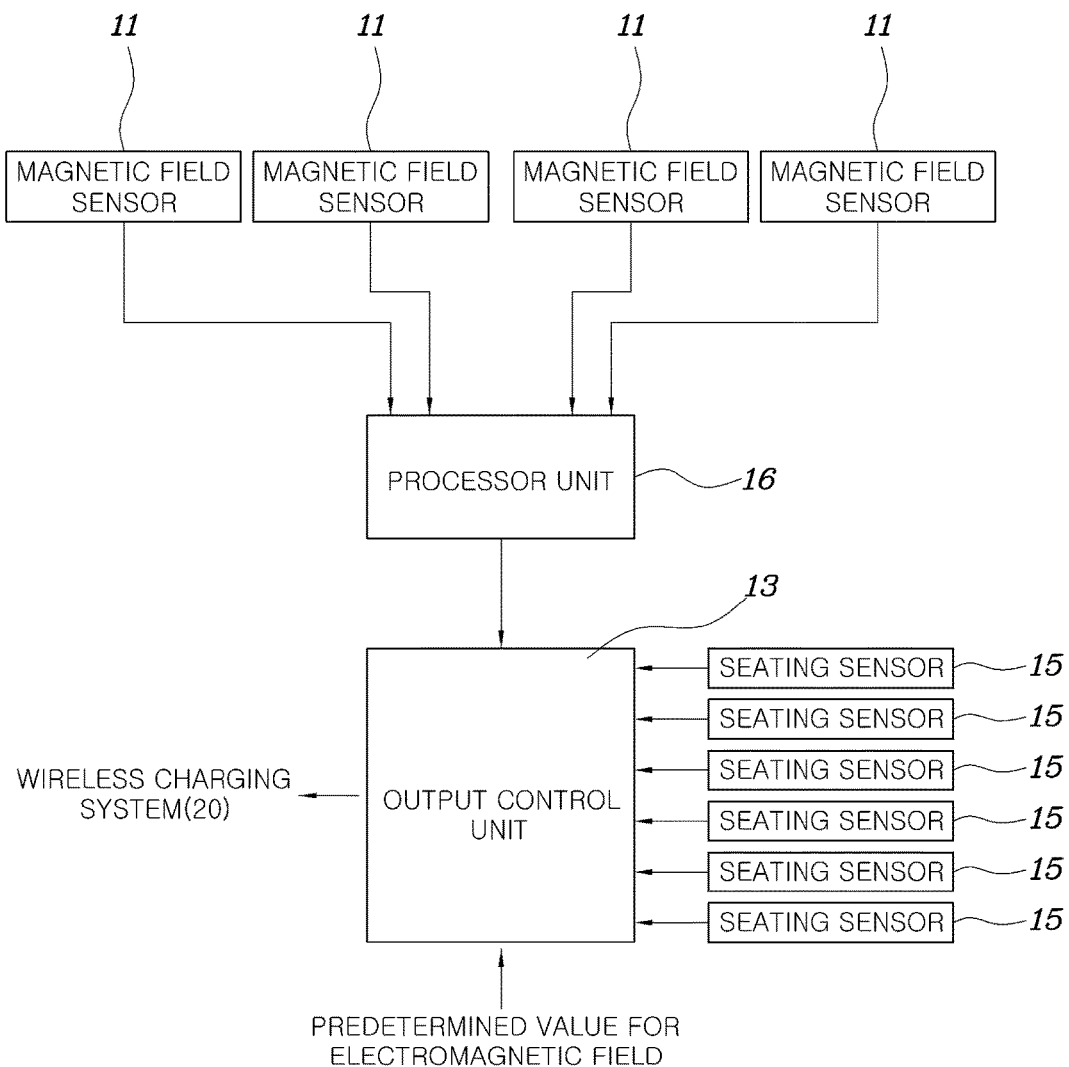
FIG. 5 is a block diagram illustrating an electromagnetic field controlling system according to another exemplary embodiment of the present invention.

In FIG. 3, a reference numeral '16' indicates a processor configured to collect and process a signal output from the magnetic field sensor 11. A detailed description of the processor unit 16 is explained through a description of an exemplary embodiment illustrated in FIG. 5. In particular, FIG. 5 illustrates an electromagnetic controlling system according to another exemplary embodiment of the present invention. Referring to FIG. 5, an electromagnetic controlling system according to another exemplary embodiment of the present invention may further include a processor 16 configured to receive an electromagnetic field detection signal output from the magnetic field sensor 11, and a seating sensor 15 configured to detect whether a passenger is within a vehicle, in addition to the exemplary embodiment illustrated in FIG. 1.

The processor 16 may be configured to collect a signal output from the magnetic field sensor 11 and convert the collected signal into a value to be processed by the output controller 13. A hall effect sensor that may be used as the magnetic field sensor 11 is a type of converter, and may be configured to output an analog voltage value that responds to the magnitude of a surrounding electromagnetic field. Since the signal output from the magnetic field sensor 11 may be an analog voltage value, the output controller 13 implemented as a digital arithmetic unit may not directly use the value for operation processing. Accordingly, the output controller 13 may include an additional device for converting the signal.

Accordingly, the processor 16 may include an analog-digital conversion module configured to convert the electromagnetic field detection signal, output from the magnetic field sensor 11, into a digital value, and a unit conversion module configured to convert the digital value, converted by the analog-digital conversion module, into a value based on a unit comparable with the predetermined value for an electromagnetic field. By applying the processor 16, many signals output from the multiple magnetic field sensors 11 may be effectively processed and operation load of the output controller 13 may be reduced.

In addition, the seating sensor 15 may be configured to detect whether a seat of a vehicle is occupied by a passenger or other object. The seating sensor 15 may be mounted in a seat cushion of the vehicle to sense the weight of a seated passenger, or may be mounted in a side of the vehicle (e.g., a pillar structure or a door) and may be implemented as an infrared sensor configured to detect whether a passenger is present in a vehicle using infrared rays. However, various types of sensors for detecting a passenger may be used.

Figure 6:
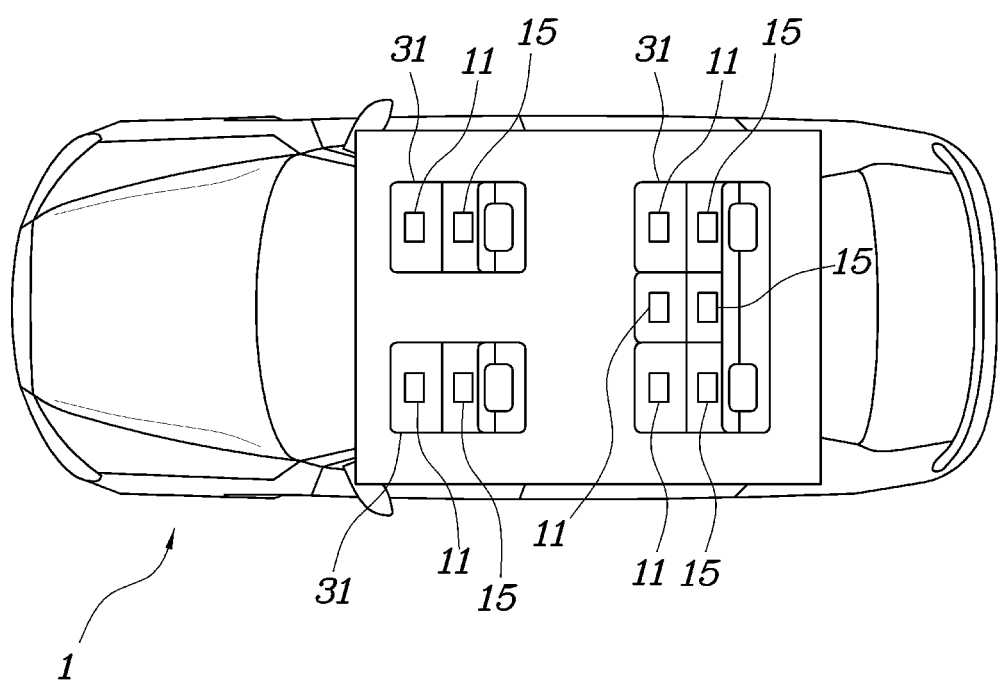
FIG. 6 illustrates an example in which a magnetic field sensor and a seating sensor of an electromagnetic field controlling system according to another exemplary embodiment of the present invention are installed.

FIG. 6 illustrates an example in which a magnetic field sensor and a seating sensor of an electromagnetic controlling system are installed according to the exemplary embodiment illustrated in FIG. 5. As illustrated in FIG. 6, to adjust electromagnetic fields in multiple seats 31 of a vehicle based on positions of occupied seats, the exemplary embodiment of FIG. 5 may install one or more magnetic field sensors 11 with the seating sensor 15 in each of the multiple seats 31 or in a position adjacent to each of the multiple seats 31.

Figure 7:
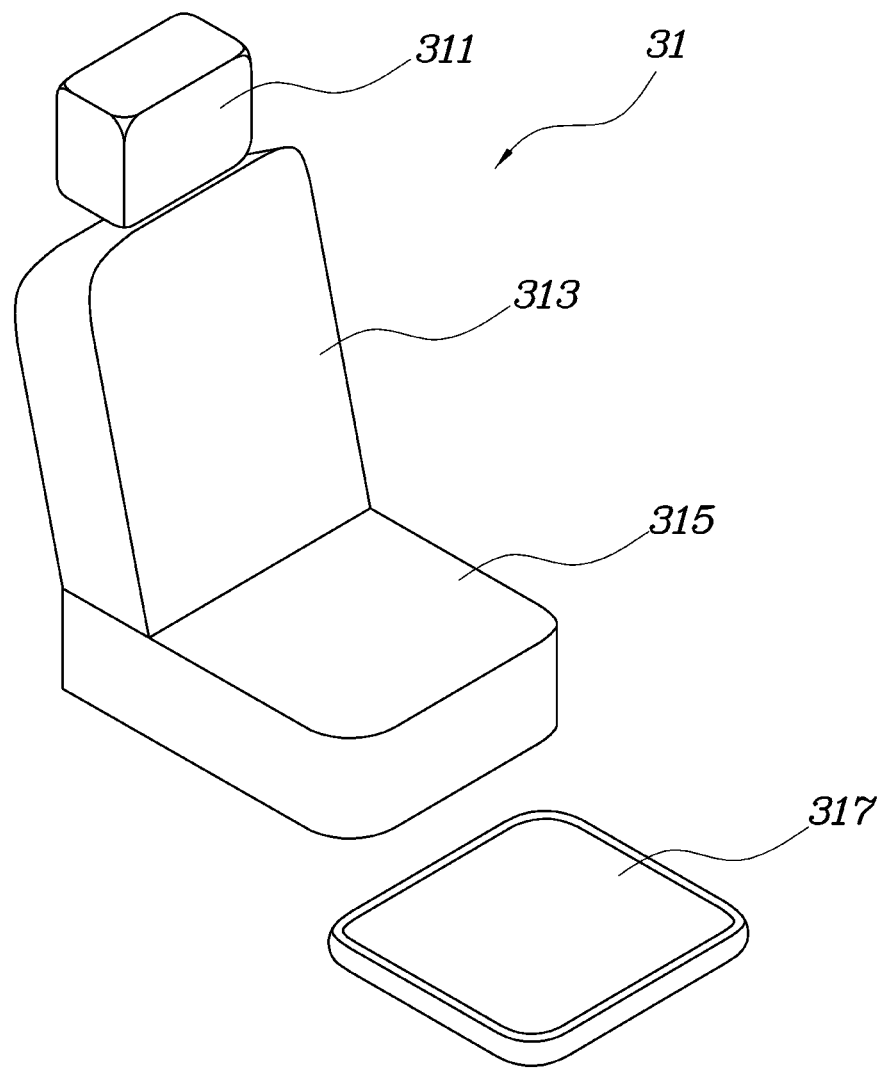
FIG. 7 is a view illustrating a position in which a magnetic field sensor of an electromagnetic field controlling system according to various exemplary embodiments of the present invention is installed.

FIG. 7 is a view illustrating a position in which a magnetic field sensor of an electromagnetic field controlling system according to various exemplary embodiments of the present invention is installed. Particularly, the position where the magnetic field sensor is installed in FIG. 7 may be applied to the exemplary embodiment illustrated in FIG. 5, in which a magnetic field sensor 11 may be installed in a vehicle seat 31.

As illustrated in FIG. 7, a magnetic field sensor 11 may be disposed in at least one position among a headrest 311, a seatback 313, a seat cushion 315, and a foot supporting part 317 of a respective seat. In an electromagnetic field controlling system according to another exemplary embodiment of the present invention, configured as the above description, the output controller 13 may be configured to adjust output power in a power transmission side of a wireless charging system 20 using the magnitude of an electromagnetic field detected by a magnetic field sensor, which may be disposed in an occupied seat detected by a seating sensor 15.

Specifically, the output controller 13 may be configured to adjust output power in the power transmission side of the wireless charging system by comparing a predetermined value for an electromagnetic field with the largest value among the magnitudes of electromagnetic fields detected by magnetic field sensors, which may be disposed in the occupied seats detected by the seating sensor 15. As a result, the output controller 13 may be configured to simultaneously adjust the magnitudes of the electromagnetic fields in other seats on which passengers are seated to be less than the predetermined value for an electromagnetic field.

According to an electromagnetic field controlling system according to another exemplary embodiment of the present invention, illustrated in FIG. 5, the magnitude of an electromagnetic field may be detected for each seat on which a passenger is seated, and the wireless charging system may be operated to maintain the magnitude of the electromagnetic field detected in the seat occupied by the passenger to be less than the predetermined value for an electromagnetic field. Therefore, in the range in which the electromagnetic field may not adversely affect the seated passengers, the charging efficiency may be maximized.

Figure 8:
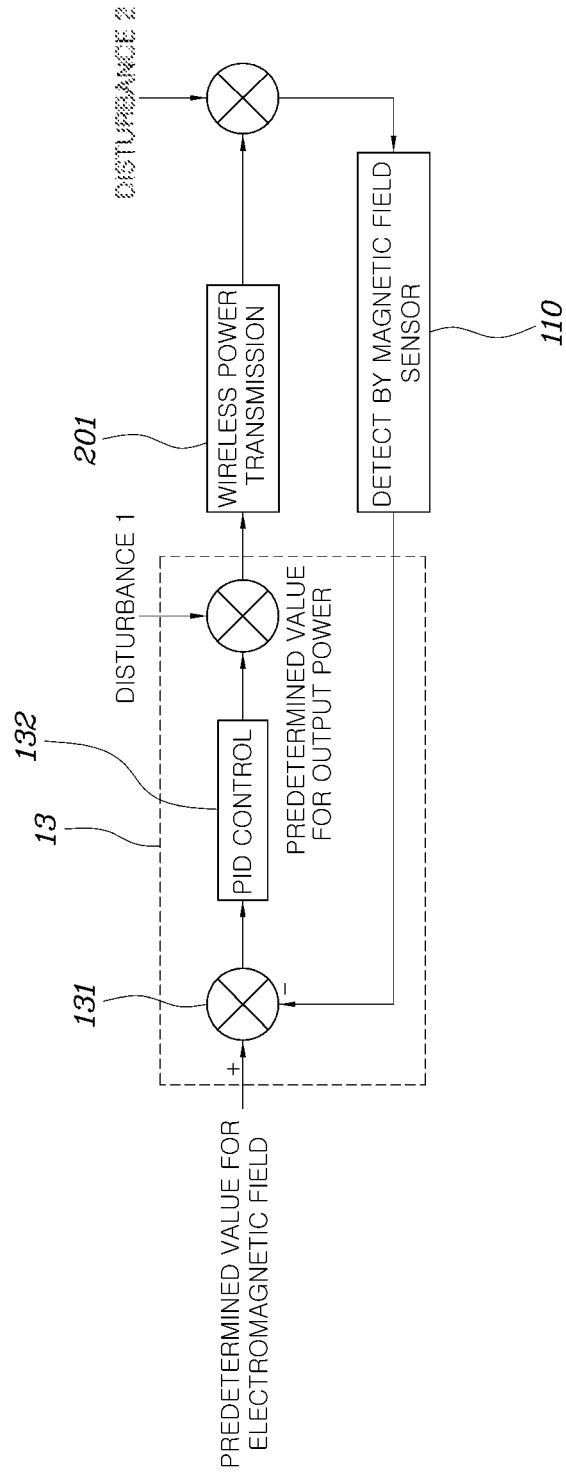
FIG. 8 is a view illustrating a controlling method of an electromagnetic field controlling system according to various exemplary embodiments of the present invention.

FIG. 8 illustrates a controlling method of an electromagnetic field controlling system according to various exemplary embodiments of the present invention. Referring to FIG. 8, the output controller 13 may be configured to calculate (131) the difference between the predetermined value for an electromagnetic field and an electromagnetic field value detected (110) by the magnetic field sensor, perform PID control (132) using the difference, and output a preset value for output power of the wireless charging system 20.

The preset value for the output power may be transmitted to the wireless charging system 20, and the power controller 21 of the wireless charging system 20 may be configured to adjust power provided to a primary coil 23 based on the preset value for the output power. Then, wireless power transmission (201) by the primary coil 23 may be performed. Unwanted components among the electromagnetic fields generated by the wireless power transmission may be detected again (110) by the magnetic field sensor 11, and the electromagnetic field value detected by the magnetic field sensor 11 may be input again to the output controller 13, and the difference between the electromagnetic field value and the predetermined value for an electromagnetic field may be calculated.

While such a control loop is repeated, the electromagnetic field value detected by the magnetic field sensor 11 gradually approaches the predetermined value for an electromagnetic field, and ideally, the difference between the two values may become zero. In this control loop, while the preset value for output power is transmitted to the wireless charging system 20, or while the electromagnetic field is detected by the magnetic field sensor 11 after power transmission by the wireless charging system 20, disturbance may be produced due to external objects (e.g., coins, soda cans, and the like), obsolete equipment, temperature change, movement of a vehicle, the shape of a vehicle, and the like. Despite such disturbances, the preset value for output power may not change substantially (e.g., may change minimally) and the electromagnetic field detection value may follow the predetermined value for an electromagnetic field, since a controlling method of an electromagnetic field controlling system according to an exemplary embodiment of the present invention may apply the PID control.

Furthermore, in an exemplary embodiment of the present invention, the output controller 13 may be configured to monitor whether an error occurs in an operation of the magnetic field sensor 11, and may be configured to adjust output power in a power transmission side of the wireless charging system 20 to be less than a predetermined level when the error occurs in the operation of the magnetic field sensor 11. In other words, when an error occurs in the magnetic field sensor 11, the output controller 13 may ignore or not consider the value detected by the magnetic field sensor 11 and may be configured to adjust output power in the power transmission side to be less than the lowest level in which adverse effects by the electromagnetic field are rarely generated.

Even though the electromagnetic field may not be detected, the exemplary embodiment of the present invention may prevent the wireless charging system from adversely exposing human bodies and other objects to an electromagnetic field. Additionally, an electromagnetic field controlling system according to an exemplary embodiment of the present invention may be turned on before a charging operation of the wireless charging system is started, and turned off after the charging operation of the wireless charging system is terminated. Accordingly, the output controller 13 of the electromagnetic field controlling system according to an exemplary embodiment of the present invention may be configured to monitor the status of operations of the wireless charging system 20, detect the states of magnetic field sensors 11 and seating sensors 15 before the charging operation of the wireless charging system 20 is started, and then provide power to initiate the operation for adjusting the electromagnetic field. In addition, the output controller 13 of the electromagnetic field controlling system according to an exemplary embodiment of the present invention may be configured to terminate the operation for adjusting the electromagnetic field after confirming that the charging operation of the wireless charging system 20 is terminated.

As described above, an electromagnetic field controlling system according to an exemplary embodiment of the present invention may monitor the operations of the wireless charging system 20, initiate the operations thereof before the charging operation of the wireless charging system 20 is started, and terminate the operations after the charging operation of the wireless charging system 20 is terminated. Therefore, a safe charging operation may be possible through the wireless charging system 20.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electromagnetic field controlling system, comprising:
a magnetic field sensor disposed in or proximate to a vehicle charged using a wireless charging system and configured to detect a magnitude of an electromagnetic field generated by a power transmission side of the wireless charging system while the wireless charging system is operating to charge a battery in the vehicle; and
an output controller configured to compare the detected magnitude of the electromagnetic field generated by the power transmission side of the wireless charging system with a predetermined value for an electromagnetic field and adjust output power in the power transmission side of the wireless charging system based on whether the detected magnitude of the electromagnetic field generated by the power transmission side of the wireless charging system is less than the predetermined value for the electromagnetic field,
wherein the magnetic field sensor is disposed on a floor of the vehicle.

2. The electromagnetic field controlling system of claim 1, wherein the magnetic field sensor is a hall effect sensor.

3. The electromagnetic field controlling system of claim 1, wherein the magnetic field sensor is disposed in multiple areas defined by a guideline for establishing a permissible electromagnetic field proximate to or in the vehicle, and the output controller is configured to adjust output power in the power transmission side to satisfy the guideline regarding the permissible magnitude of an electromagnetic field, defined for each of the multiple areas in which the magnetic field sensor is installed.

4. The electromagnetic field controlling system of claim 1, wherein the magnetic field sensor is installed in at least one position selected from the group consisting of: a headrest, a seatback, a seat cushion, and a foot supporting part of a seat within the vehicle.

5. The electromagnetic field controlling system of claim 1, wherein the output controller is configured to perform proportional-integral-derivate (PID) control for output power in the power transmission side of the wireless charging system, using the difference between the predetermined value for an electromagnetic field and the magnitude of the electromagnetic field detected by the magnetic field sensor.

6. The electromagnetic field controlling system of claim 1, wherein the output controller is configured to decrease the output power in the power transmission side of the wireless charging system to be less than a predetermined level when an error occurs in an operation of the magnetic field sensor.

7. The electromagnetic field controlling system of claim 1, wherein the electromagnetic controlling system is turned on before a charging operation of the wireless charging system is started, and is turned off after the charging operation of the wireless charging system is terminated.

8. The electromagnetic field controlling system of claim 1, wherein the controller includes:
   an analog-digital conversion module configured to convert an electromagnetic field detection signal, output from the magnetic field sensor, into a digital value; and
   a unit conversion module configured to convert the digital value, converted by the analog-digital conversion module, into a value based on a unit comparable with the predetermined value for an electromagnetic field.

9. The electromagnetic field controlling system of claim 1, further comprising:
   a seating sensor disposed in a seat of the vehicle and configured to detect whether a passenger is seated on the seat,
   wherein the seating sensor is disposed in the seat or proximate to the seat in the vehicle, and the output controller is configured to adjust the output power in the power transmission side of the wireless charging system, using the magnitude of the electromagnetic field detected by the magnetic field sensor disposed in the seat occupied by a passenger, the seat being detected by the seating sensor.

10. The electromagnetic field controlling system of claim 9, wherein the output controller is configured to adjust the output power in the power transmission side of the wireless charging system by comparing the predetermined value for an electromagnetic field with a largest value among the magnitudes of the electromagnetic fields detected by the magnetic field sensors disposed in the seats occupied by a passenger.

11. An electromagnetic field controlling method, comprising:
   detecting, by a magnetic field sensor, a magnitude of an electromagnetic field proximate to a vehicle charged using a wireless charging system, while the wireless charging system is operating to charge a battery in the vehicle, the electromagnetic field generated by a power transmission side of the wireless charging system;
   comparing, by a controller, the detected magnitude of the electromagnetic field generated by the power transmission side of the wireless charging system with a predetermined value for an electromagnetic field; and
   adjusting, by the controller, output power in the power transmission side of the wireless charging system based on whether the detected magnitude of the electromagnetic field generated by the power transmission side of the wireless charging system is less than the predetermined value for the electromagnetic field,
   wherein the magnetic field sensor is disposed on a floor of the vehicle.

12. The electromagnetic field controlling method of claim 11, further comprising:
   detecting, by the magnetic field sensor, an electromagnetic field in multiple areas defined by a guideline establishing a permissible electromagnetic field proximate to or in the vehicle; and
   adjusting, by the controller, output power in the power transmission side to satisfy a guideline about a permissible magnitude of an electromagnetic field, defined for each of the multiple areas in which the electromagnetic field is detected.

13. The electromagnetic field controlling method of claim 11, further comprising:
   detecting, by a seating sensor, whether a passenger is seated on a seat of the vehicle;
   detecting, by the magnetic field sensor, an electromagnetic field in the seat of the vehicle; and
   adjusting, by the controller, output power in the power transmission side of the wireless charging system, using the magnitude of the electromagnetic field detected in the seat occupied by a passenger.

14. A non-transitory computer readable medium containing program instructions executed by a controller, the computer readable medium comprising:
   program instructions that control a magnetic field sensor to detect a magnitude of an electromagnetic field proximate to a vehicle charged using a wireless charging system, while the wireless charging system is operating to charge a battery in the vehicle, the electromagnetic field generated by a power transmission side of the wireless charging system;
   program instructions that compare the detected magnitude of the electromagnetic field generated by the power transmission side of the wireless charging system with a predetermined value for an electromagnetic field; and
   program instructions that adjust output power in the power transmission side of the wireless charging system based on whether the detected magnitude of the electromagnetic field generated by the power transmission side of the wireless charging system is less than the predetermined value for the electromagnetic field,
   wherein the magnetic field sensor is disposed on a floor of the vehicle.

15. The non-transitory computer readable medium of claim 14, further comprising:
   program instructions that control the magnetic field sensor to detect an electromagnetic field in multiple areas defined by a guideline establishing a permissible electromagnetic field proximate to or in the vehicle; and
   program instructions that adjust output power in the power transmission side to satisfy a guideline about a permissible magnitude of an electromagnetic field, defined for each of the multiple areas in which the electromagnetic field is detected.

16. The non-transitory computer readable medium of claim 14, further comprising:
   program instructions that control a seating sensor to detect whether a passenger is seated on a seat of the vehicle;
   program instructions that control the magnetic field sensor to detect an electromagnetic field in the seat of the vehicle; and
   program instructions that adjust output power in the power transmission side of the wireless charging system, using the magnitude of the electromagnetic field detected in the seat occupied by a passenger.

* * * * *